United States Patent [19]

Akhtar

[11] Patent Number: 4,851,308
[45] Date of Patent: Jul. 25, 1989

[54] SOLID-STATE ENERGY STORAGE CELL WHEREIN THE ELECTROLYTE COMPRISES AN ORGANIC SUPPORT AND AN INORGANIC SALT

[75] Inventor: Masud Akhtar, Lawrenceville, N.J.

[73] Assignee: Chronar Corp., Princeton, N.J.

[21] Appl. No.: 145,031

[22] Filed: Jan. 19, 1988

[51] Int. Cl.$^4$ .............................................. H01M 6/18
[52] U.S. Cl. ................................... 429/192; 429/193; 429/213
[58] Field of Search ............................... 429/191–193, 429/218, 213, 212

[56] References Cited

U.S. PATENT DOCUMENTS

| | | | |
|---|---|---|---|
| 3,988,164 | 10/1976 | Liang et al. | 429/191 |
| 4,066,824 | 1/1978 | Rao et al. | 429/191 X |
| 4,535,039 | 8/1985 | Naarmann et al. | 429/213 |
| 4,576,888 | 3/1986 | Davis et al. | 429/192 |
| 4,579,793 | 4/1986 | Armand et al. | 429/192 |
| 4,589,197 | 5/1986 | North | 29/623.1 |
| 4,702,974 | 10/1987 | Gregory et al. | 429/192 X |
| 4,704,341 | 11/1987 | Weppner et al. | 429/192 |
| 4,714,665 | 12/1987 | Siegel et al. | 429/192 |
| 4,728,589 | 3/1988 | MacDiarmid et al. | 429/213 |

*Primary Examiner*—Anthony Skapars
*Attorney, Agent, or Firm*—George E. Kersey

[57] ABSTRACT

Thin film solid state batteries and electrochromic devices are prepared in which one of the electrodes is an electronic organic polymeric material. The counter electrode is an alkali metal ion acceptor and releaser in an appropriate electrolyte containing an alkali metal salt. The counter electrode can also be a non-alkali metal with its salt in the electrolyte. The organic polymer can also be replaced by sulfides, oxides, or selenides. The devices operate at ambient temperatures. The batteries can also be combined with photovoltaic devices to form a single unit which can store solar energy.

11 Claims, 2 Drawing Sheets

SOLID-STATE ENERGY STORAGE CELL WHEREIN THE ELECTROLYTE COMPRISES AN ORGANIC SUPPORT AND AN INORGANIC SALT

BACKGROUND OF THE INVENTION

This invention relates to the sourcing of electrical energy by compact devices, and more particularly to compact batteries.

Batteries commonly employ oppositely poled electrodes at which oxidation and reduction reactions take place in conjunction with a liquid electrolyte that serves as the medium of transfer of ions between the electrodes. When such electrodes are connected to an external circuit with a load, current flows in the circuit and the load is energized.

Liquid electrolytes, which can be aqueous or non-aqueous, have a number of disadvantages. Care must be exercised in controlling the hydrogen ion concenration (pH) in order to prevent the electrolyte from adversely affecting the electrochemical activity of the associated electrodes. In particular, some electrodes suffer a loss in electrochemical activity when in contact with solutions where the hydrogen ion concentration approaches 7, which is the concentration for a neutral solution which is neither acidic nor alkaline, such as pure water. Unless the hydrogen ion concentration of the electrolyte is maintained well below neutral the electrodes can have their electrochemical activity adversely affected.

Similarly, metallic electrodes, such as those fabricated from zinc, undergo spontaneous dissolution in an acid media. Such electrodes consequently cannot be used despite their desirable properties.

Moreover, the protection of a liquid electrolyte from atmospheric oxidation is difficult. This oxidation causes a loss of electrolytic properties and is one reason for the commonly encountered deterioration of batteries with aging.

In addition, batteries and other electrical storage devices which make use of liquid electrolytes have a corresponding increase in weight and volume due to the natural bulk of fluids.

Accordingly, it is an object of the invention to facilitate the sourcing of electrical energy, and to realize the efficient forms for the generation and storage of energy. A related object is to facilitate efficient energy generation by compact devices.

Another object of the invention is to simultaneously increase the life and reduce the cost of compact energy storage and generation devices. A related object is to overcome the adverse aging phenomenon that is commonly associated with liquid electrolytes.

Still another object of the invention is to limit the criticality associated with the use of liquid electrolytes, particularly in connection with opposite poled electrodes. A related object is to reduce the loss of electrode electrochemical activity by virtue of alterations in the hydrogen ion concentration. Another related object is to achieve electrode use which is not adversely affected by liquid electrolytes.

Yet another object of the invention is to use low cost techniques in the realization of suitable, compact energy generators and storage devices. Another object is to enhance performance of energy storage devices at ambient temperatures.

A further object is to reduce the size of energy storage devices for a prescribed amount of energy storage, while simultaneously prolonging the shelf and work life of the devices. A related object is to provide energy storage devices which are capable of rapid recovery from over-load and short circuit conditions. Another related object is to realize energy storage devices which are not permanently damaged by overload and short circuit conditions.

A still further object of the invention is to facilitate the use of new materials in the realization of energy storage.

Yet another object of the invention is to realize energy storage devices which are rechargeable for extended intervals and not degrade upon successive recharging. A related object is to increase the period of storage activity between required rechargings. Another related object is to increase the number of rechargings that are permitted while continuing to provide suitable service.

A further object of the invention is the fabrication of cheap, light weight and solid state electrochromic devices.

SUMMARY OF THE INVENTION

In accomplishing the foregoing and related objects, the invention provides a solid-state energy storage apparatus formed by oppositely poled electrodes capable of producing electrochemical oxidation-reductions; with an intervening solid-state electrolyte in contact with the electrodes. The oppositely poled electrodes are respectively designated as "base" and "counter" electrodes.

The solid-state electrolyte is an inorganic salt containing a metallic ion advantageously positioned on a porous support. The metallic ion of the inorganic salt can be selected from Group I, II or IV of the Periodic Table. Group I metals include lithium; Group II metals include zinc; Group IV metals include lead. The inorganic salt can be a halide. The solid-state electrolyte can also be a protonic acid complexed with an amine, imine or polyoxide.

In accordance with one aspect of the invention the counterelectrode is the metal counterpart of the metallic ion in the solid-state electrolyte. The counterelectrode can also be the oxidized form of the metal used for the solid-state electrolyte.

In accordance with another aspect of the invention at least one of the electrodes is an electroactive polymer selected from the class including polyaniline, polyacetylene, polyphenylene polypyrrole, polythiophene, polycarbazole or their derivatives.

In accordance with a further aspect of the invention the porous support is polymeric and can be selected from the class including polymers, such as polyethylene and halogenated polyethylenes (teflons), polymeric oxides, halides, sulfides and imines.

According to a further aspect of the invention the salt of the solid-state electrolyte can be selected from the class of lithium compounds including lithium perchlorate, lithium hexafluroarsenate, lithium trifluoromethanesulfonate, and lithium iodide or chloride. When the electrolyte is a zinc salt, it can be selected from the class including zinc sulphate, zinc chloride, zinc bromide and zinc trifluoromethanesulfonate. When the electrolyte is a lead salt it can be selected from the class of lead halides including lead chloride and lead bromide etc. A mixture of two salts of a metal ion can also be employed in one electrolyte to enhance the ambient temperature performance of the electrolyte.

According to another aspect of the invention when the base electrode is an electroactive organic polymer, the counter electrode can be selected from a class of metals; metal oxides including vanadium oxides, manganese dioxide and tungston oxide etc; or from a class of complex compounds like iron (III) tungstate, lithium tungstate and potassium ferric ferrocyanide etc. The electrical conductivity of oxide and complex electrodes can be increased by mixing them with graphite or various metal powders.

According to another aspect of the invention the electroactive organic polymer electrode can be replaced by a metallic sulfide, a non-metallic sulfide, a polysulfide or a selenide in conjuction with a suitable counter electrode.

In a method of producing a compact energy source, a solid electrolyte is incorporated between oppositely poled electrodes which are capable of producing an electrochemical oxidationreduction.

The electrode can be produced by thermal evaporation, or by chemical or electrochemical deposition. The solid electrolyte can be produced by coevaporation of a support material and an inorganic salt.

The solid electrolyte also can be produced by dispersing an ionic conductor over an inert support.

When the solid electrolyte is produced by coevaporation of a polymer with a metallic salt, the polymer can be a polyethylene oxide or halide.

A particular feature of the invention is that the solid state devices operate at ambient temperatures (10–30° C.), hence the electrolytes have to be appropriately prepared from a mixture of high molecular weight and low molecular weight polymer additives with an inorganic salt. A suitable technique to prepare such solid electrolyte films is from solution casting where the organic solvent evaporates under an inert atmosphere to leave the desired solid composite elecrolyte..

DESCRIPTION OF THE DRAWINGS

Other aspects of the invention will become apparent after considering several illustrative embodiments taken in conjunction with the drawings in which.

ILLUSTRATIVE EXAMPLES OF THE INVENTION

In order to describe the nature of the present invention, the following examples are given as illustrative embodiments of the novel process. The process involves the following steps (i) the preparation of the eletrolyte, (ii) the preparation of the electrodes and (iii) the device assembly. Such operations were performed under inert atmosphere or under vacuum. Various modifications and changes of the process can be made without departure from the spirit and scope of the invention. Single cell structure is described in examples. Such cells can be connected in series or in parallel to form a battery with the desired voltage or current. The batteries can be flat, cylindrical or flexible rolls etc.

EXAMPLE 1

An electrochromic device is shown in FIG. I. A ~5000 Å film of solid membrane 23 (cast from solution) with the composition polyethylene oxide (mol. wt. ~600,000): lithium trifluoromethanesulfonate (Li-$SO_3CF_3$)=8:1 by weight was placed between a thin (~4000 Å) thermally evaporated film of $Fe_2(WO_4)_3$ on conducting glass and polyaniline hydrochloride (~3000 Å) grown electrochemically on conducting glass. The device was clamped and its edges covered with epoxy. The cyclic voltammograms were recorded between the applied voltage −3 V to +3 V. Polyaniline got reduced at −1.95 V (colorless state) and oxidized at +0.45 V (green-blue color). The initial voltammogram and the voltammogram recorded after 40,000 cycles are quite similar and indicate the stable and reversible oxidation-reduction of polyaniline and its suitability as an anode or a cathode material. It also shows that a solid state battery or an electrochromic device can employ both polyaniline electrodes. Another characteristic property of the device is a slight shift in oxidation-reduction voltage for each cycle, and it depends upon the device history (i.e. the memory effect.) The chemical reactions taking place at polyaniline are quite complicated, hence only simplified reactions are shown to describe the color change.

At polyaniline:

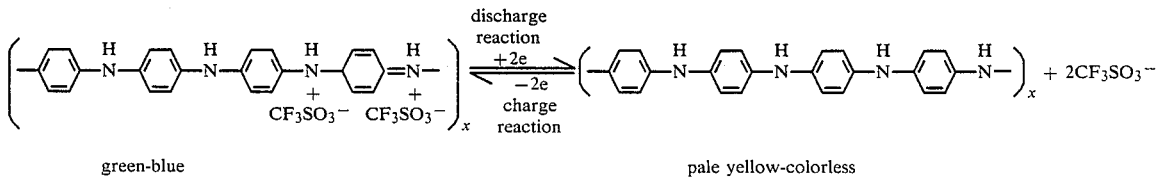

green-blue                                                     pale yellow-colorless At iron tungstate:

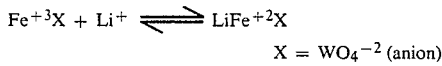

$$X = WO_4^{-2} \text{ (anion)}$$

EXAMPLE 2

Figure 1:
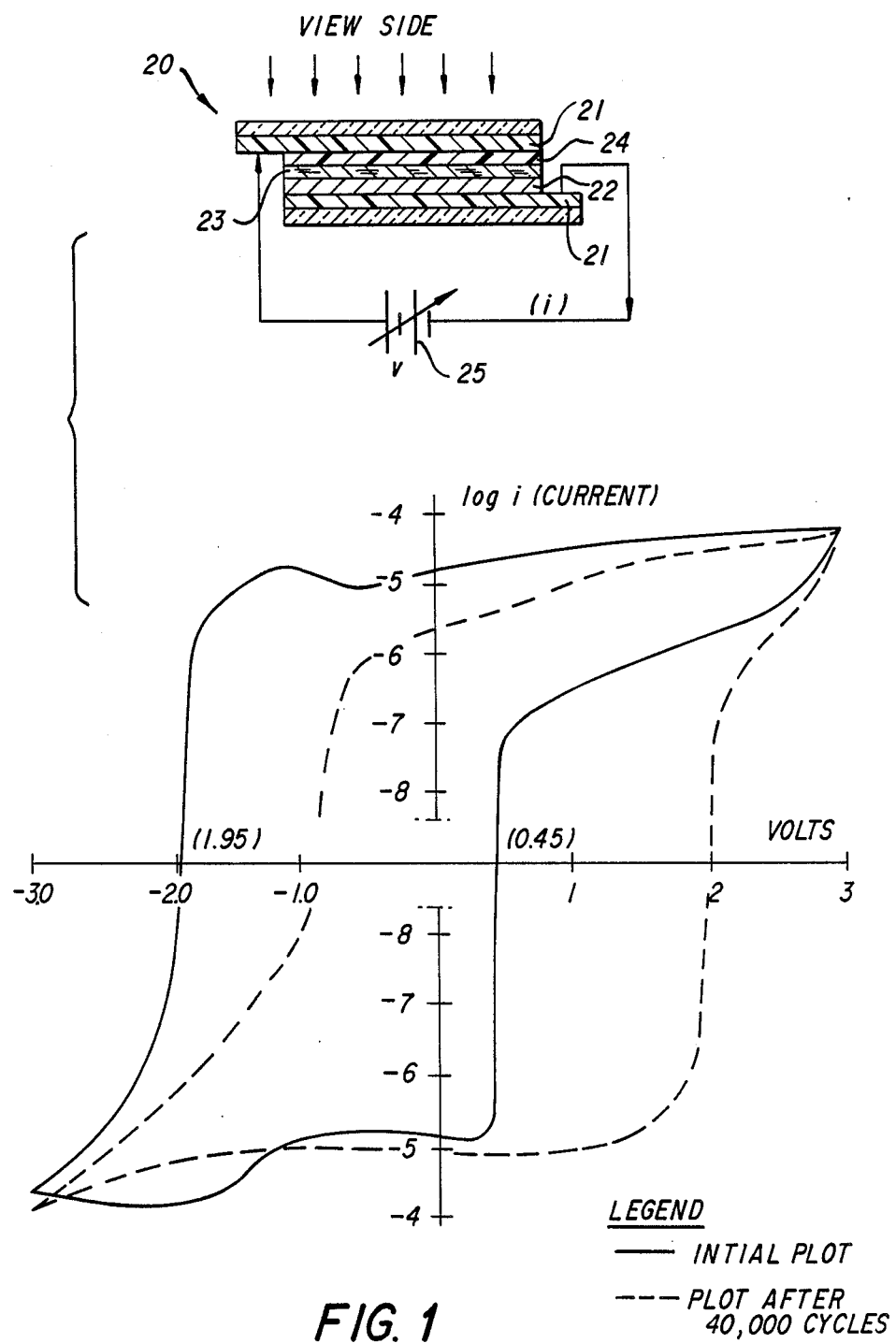
FIG. 1 is a solid state electrochromic device 20 fabricated between two conducting $SnO_2$ glass plates 21 by placing thin films of iron-tungstate 22, electrolyte 23 and polyaniline 24. The device is energized by a power supply 25 whose voltage is reversible within a time interval less than a second.
Figure 2:
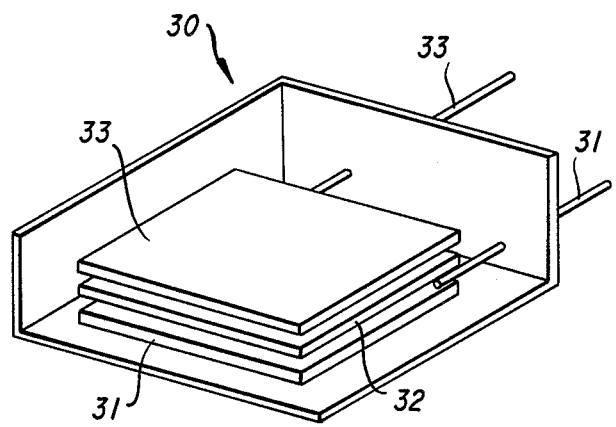
FIG. 2 is a solid state battery 30 prepared between two nickel current collecting thin sheets. A fired paste 31 of iron-tungstate $Fe_2(WO_4)_3$ covered the anode sheet and a dried paste 33 of polyaniline base form (in a small amount of electrolyte) covered the cathode sheet. A film of polymer electrolyte 32 is pressed between the cathode 33 and anode 31 plates. The battery 30 thus prepared is then housed in a plastic casing.

A solid state battery (1 cm² area) was constructed as shown in FIG. 2 using thin sheet nickel substrates. Electrode plates were made from polyaniline base powder

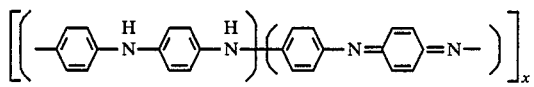

with 20% Teflon (cathode) and iron-(III) tungstate powder with 20% graphite (anode) which was fired at 450° C. with a binder. Electrolyte film was cast from gel and dried. Electrolyte composition is given below:

| Polyethylene oxide $(-CH_2CH_2O-)_x$ mol. Wt. $\sim 6 \times 10^5$) | Polyethyleneglycol-dimethyl ether $(CH_3O(CH_2CH_2O)_xCH_3)$ (mol. Wt. $\sim 400$) | $LiSO_3CF_3$ | Teflon (microporous powder) |
| --- | --- | --- | --- |
| 2 gms | 1 gm | 0.40 gm | 0.20 gm |

The battery showed an open circuit voltage (Voc) of 0.1 V and short circuit current (Isc) of $0.4 \times 10^{-6}$ amperes. At room temperature ($\sim 21°$ C.) it was charged and discharged efficiently between 2.5 V and 0.7 V several times.

EXAMPLE 3

A battery was constructed as described in EXAMPLE 2 where $Fe_2(WO_4)_3$ was replaced by 0.5 mm thick Li ribbon. The battery had Voc=2.6 V and Isc=2.5 mA. The battery was efficiently charged and discharged between 4.2 V and 2.5 V several times.

EXAMPLE 4

A battery was prepared using the electrolyte described in EXAMPLE 2 where polyaniline was replaced by $TiS_2$ and $Fe_2(WO_4)_3$ was replaced by a Li/Al alloy foil. The battery was efficiently charged and discharged between 3.0 V and 1.4 V several times.

EXAMPLE 5

An electrolyte film ($\sim 1$ mm thick) was prepared by drying a gel with the following composition which was prepared in acetonitrile.

| Polyethylene oxide $(-CH_2CH_2O-)_x$ (mol. Wt. $\sim 6 \times 10^5$) | Polyethyleneglycol-dimethyl ether $(CH_3O(CH_2CH_2O)CH_3$ (mol. Wt. $\sim 400$) | $Zn(SO_3CF_3)_2$ | $ZnCl_2$ | Teflon (microporous powder) |
| --- | --- | --- | --- | --- |
| 2 gms | 2 gms | 0.8 gms | 0.40 gm | 0.2 gms |

A battery was prepared using this electrolyte as described in EXAMPLE 2 where $Fe_2(WO_4)_3$ was replaced by 0.25 mm thick Zn foil. The battery had Voc=0.88 V and Isc=8 mA. This battery was efficiently charged and discharged between 1.7-0.5 V several hundred times.

EXAMPLE 6

An electrolyte film ($\sim 1.5$ mm thick) was prepared by drying a gel with the following composition which was prepared in acetonitrile:

| Polyethylene oxide $(-CH_2CH_2O-)_x$ (mol. Wt. $\sim 6 \times 10^5$) | Polyethyleneglycol-dimethyl ether $(CH_3O(CH_2CH_2O)CH_3$ (mol. Wt. $\sim 400$) | $ZnCl_2$ | $NH_4Cl$ | Teflon (microporous powder) |
| --- | --- | --- | --- | --- |
| 3 gms | 3 gms | 1 gm | 0.5 gm | 0.3 gms |

Figure 3:
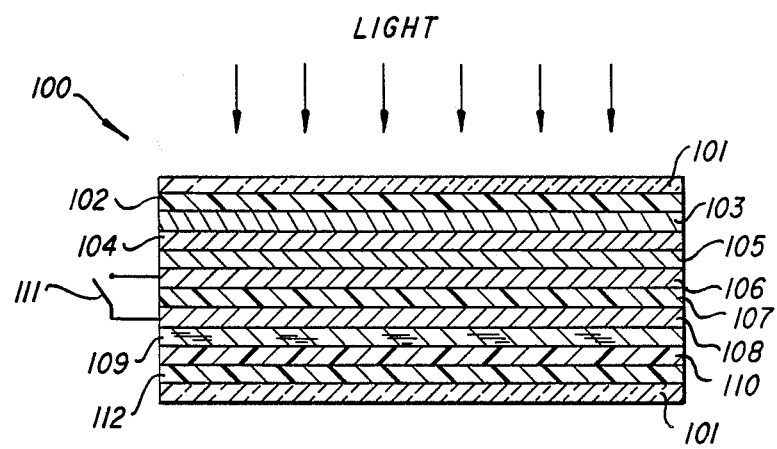
FIG. 3 is an amorphous silicon solar cell-zinc polyaniline battery module 100, constructed between two glass plates (101) having thin coatings of conductive tin oxide (102) and (112) about 800 Å thick. A P-I-N hydrogenated amorphous silicon solar cell was deposited on (102) with a total thickness of ~5300 Å which had an Aluminum back contact (106). The solar cell was separated from the battery through a thin film of Teflon while the switch (111) could connect the two.

A battery was prepared by placing this film of electrolyte between a disc of polyaniline hydrochloride and a zinc foil. The battery had a Voc=0.6 V and Isc=5 mA. This battery was combined with a thin film amorphous silicon solar cell by contact switch (III) as shown in FIG. 3. The battery was charged by current produced in the solar cell when the electrodes (102) and (112) were connected while the solar cell was under light. Connection of a load between electrodes (108) and (112) discharges the accumulated electricity. Reconnecting the (102) and (112) electrodes recharges the battery. Thus photocharging - discharging cycles between 1.8-0.7 V were repeated for more than 600 times.

EXAMPLE 7

An electrolyte was prepared by adding concentrated sulfuric acid to a branched poly(ethylenimine) of molecular weight $4 \times 10^5$ in water with the weight ratio of acid to imine=0.2/1. Water was evaporated under vacuum. The resulting paste was coated on a $SnO_2$ coated glass plate. Then a polyaniline-hydrochloride film (also on a $SnO_2$ coated glass) was placed and clamped over it. Polyaniline film changed color between pale yellow (colorless) and green when a switching voltage of $\mp 2$ V was applied between the two conducting glass plates. The color change took place during less than one second and the device did not degrade even after 1 million cycles.

A 1.5 V battery was prepared when the similar electrolyte was placed with polyaniline-hydrochloride in the following configuration: zinc plate/electrolyte+-polyaniline-hydrochloride/graphite plate.

I claim:

1. A solid-state energy storage cell comprising
a base electrode capable of producing electrochemical oxidation-reduction;
a solid-state electrolyte formed by the combination of an organic support and an inorganic salt containing a metallic ion in contact with said electrode; and
a counter electrode in contact with said electrolyte.

2. Apparatus as defined in claim 1 wherein said organic support is polymeric and porous and is a composite of low molecular weight (400–1000) and high molecular weight ($4 \times 10^4$–$6 \times 10^5$) components.

3. Apparatus as defined in claim 2 wherein said polymeric support is selected from the class consisting of organic or organometallic polymeric oxides, sulfides, halides and alkyls, including polyethylene oxides, polyethylenes, and teflons.

4. Apparatus as defined in claim 1 wherein the metallic ion of said inorganic salt is selected from (A) Group I of the Periodic Table and includes lithium; (B) Group II of the Periodic Table and includes zinc; and (C) Group IV of the Periodic Table and includes lead.

5. Apparatus as defined in claim 1 wherein said inorganic salt is a halide.

6. Appraatus as defined in claim 1 wherein said counterelectrode is selected from the class consisting of a reduced metal of the metallic ion of said solid-state electrolyte, and the oxidized form of the metal ion of said solid-state electrolyte.

7. Apparatus as defined in claim 1 wherein at least one of said electrodes is an electroactive organic polymer selected from the class consisting of polyanilin, polypyrrole, polyacetylene, parapolyphenylene, polythiophene, polycarbazol or their derivatives.

8. Apparatus as defined in claim 4 wherein lithium salt is selected from the class consisting of lithium perchlorate, lithium hexafluoroarsenate, lithium trifluoromethanesulfonate and lithium chloride or iodide; and zinc salts are selected from the class consisting of zinc sulphate, zinc chloride, zinc bromide and zinc trifluoromethanesulfonate; and lead salts are selected from the class consisting of lead chloride, lead bromide and lead iodide.

9. Apparatus as defined in claim 4 wherein said counterelectrode is selected from the class consisting of metal oxides including vanadium oxides, manganese dioxide, tungston oxide, or a mixture of such oxides.

10. Apparatus as defined in claim 4 wherein said counter electrode is selected from a group of sulfides, polysulfides or selenides including sulfides of titanium and molybdenum.

11. Apparatus as defined in claim 4 wherein said counter electrode is selected from a group of metal complexes consisting of iron (III) tungstate, lithium tungstate and potassium ferric ferrocyanide, or a complex mixture of oxides with sulfides.

* * * * *